United States Patent [19]

Heinzman

[11] Patent Number: 5,017,851
[45] Date of Patent: May 21, 1991

[54] MECHANICAL ROTATING COMBINATION LOCK OPENING DEVICE

[76] Inventor: Fred C. Heinzman, 457 Pine Needles Dr., Del Mar, Calif. 92014

[21] Appl. No.: 240,732

[22] Filed: Sep. 6, 1988

[51] Int. Cl.⁵ .............................................. G05B 19/40
[52] U.S. Cl. .................................... 318/685; 318/696; 70/446
[58] Field of Search ................... 318/685, 696; 70/446

[56] References Cited

U.S. PATENT DOCUMENTS 4,433,563 2/1984 Wilson .................................... 70/446
4,591,774 5/1986 Ferris et al. ......................... 318/696

Primary Examiner—William M. Shoop, Jr.
Assistant Examiner—Saul M. Bergmann
Attorney, Agent, or Firm—Frank D. Gilliam

[57] ABSTRACT

A computer controlled electric motor with a driving shaft having a resilient cup type safe knob gripper fixedly attached to the distal end thereof for rotation therewith. A key pad for programing the computer memory with a plurality of different rotational sequences. Each sequence is associated with a combination of a different combination lock. Any of the lock opening rotational sequences stored in the computer memory can be addressed by the key pad. A storage battery provides operating and stand by power for the computer, memory and motor.

9 Claims, 2 Drawing Sheets

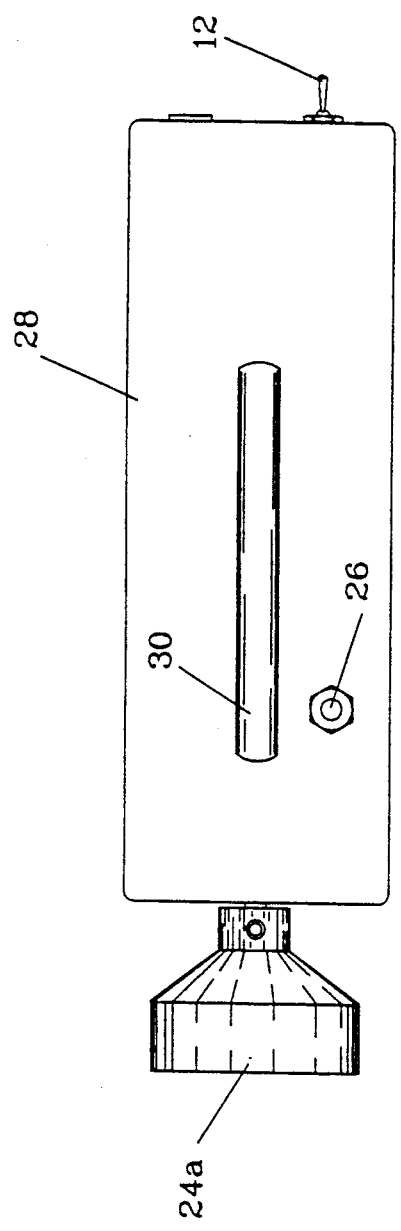
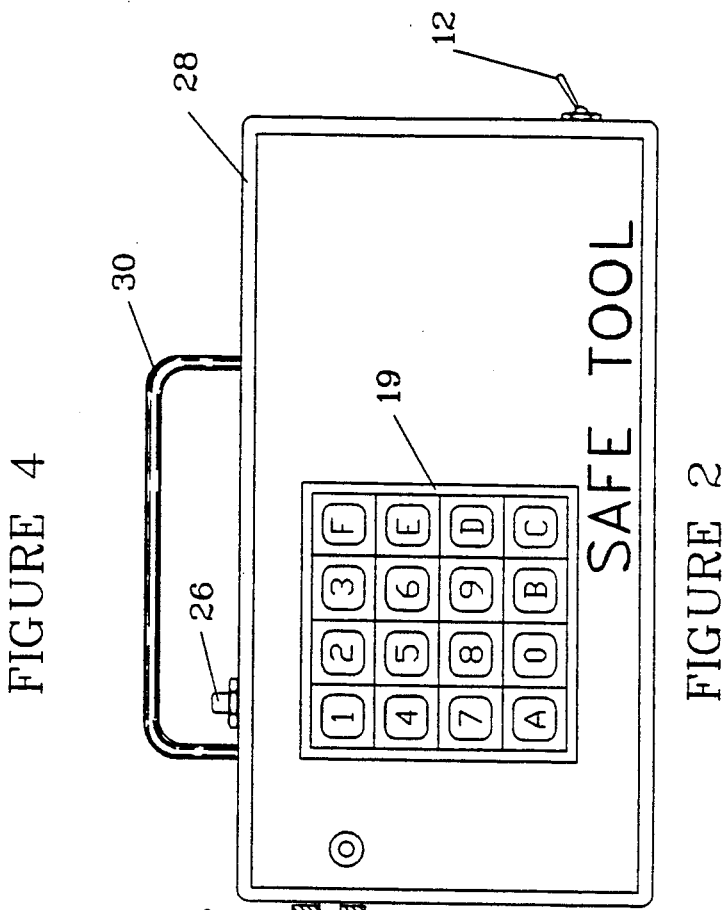
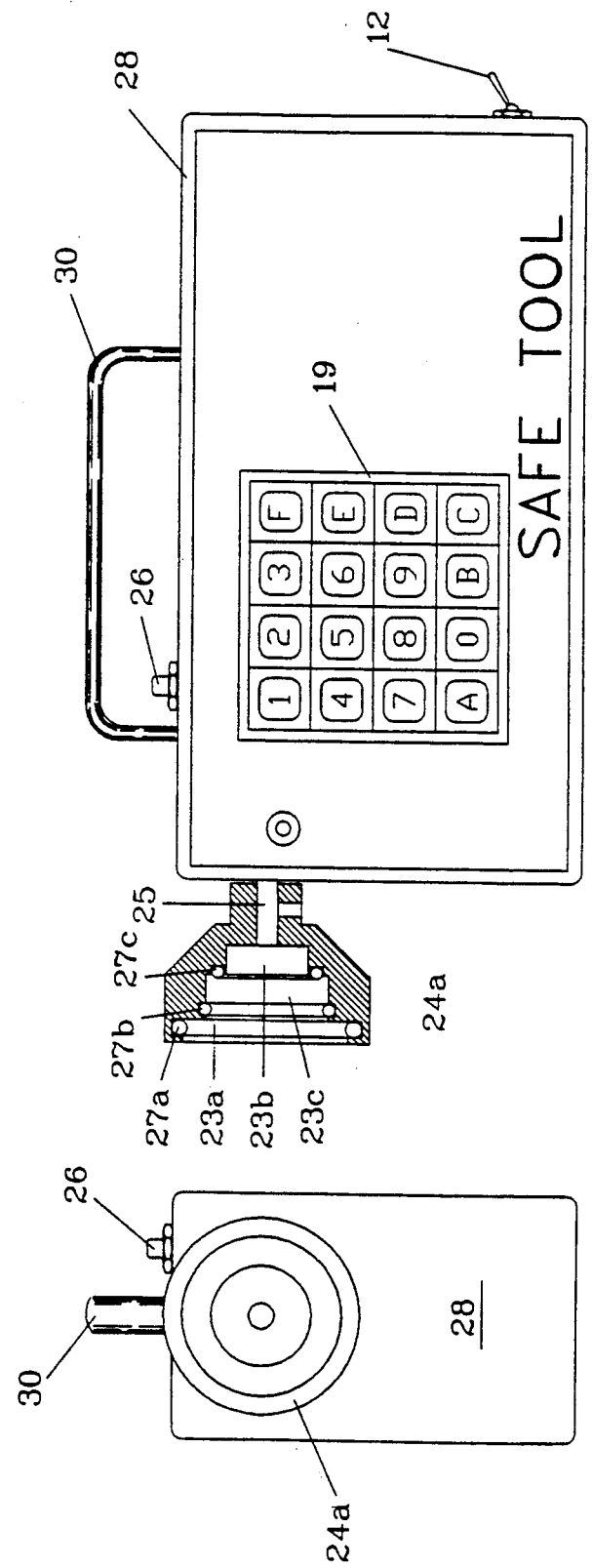

MECHANICAL ROTATING COMBINATION LOCK OPENING DEVICE

BACKGROUND OF THE INVENTION

This invention is directed to a mechanical device for the opening of electromechanical rotating combination locks such as those commonly found on safes and locks, and particularly to a device of this nature which includes an electric motor that is controlled by a computer with a memory having a plurality of different selected rotational motor sequences are stored therein and addressed via a key pad for rotating the locking mechanism of a selected combination safe or lock for opening.

In a large number of government offices and private industries there is a requirement to lock up a plurality of classified documents and other items for national and private security purposes. The documents and items are generally stored in special file cabinets designed especially for that purpose which are secured with one or more rotational knob type combination locks. These documents and items must be kept in a locked cabinet or safe when not in actual use and those items that are being used must again be locked in a file cabinet or safe at the end of the users work shift.

It can be appreciated that it is a tremendous task for security personnel to open the required combination locks for use on a specific work shift for establishments which may have hundreds of such locks that require opening at least once or more daily. Many man hours are lost in this task.

Until the emergence of this invention there has not been a satisfactory apparatus for opening such combination locks other than manual manipulation of the combination sequence on each lock in turn. A semi-automatic mechanism for opening such combination locks would be widely accepted for use by establishments having a large number of combination locks which are opened at least once a day.

SUMMARY OF THE INVENTION

This invention is directed to an electrically operated motor which has a cup type combination lock knob engaging, and gripping element fixedly positioned on the outer distal end of the driving shaft. The degrees of rotation and direction thereof of the driving shaft is controlled by a computer having a memory into which a selected rotational sequence can be programed or addressed via a key pad for each combination that is required to be periodically opened. The amount of such storage is determined by the capacity of the memory chosen. The device is portable and could be battery powered or powered from an AC convenience outlet.

The device of the invention may take any desired shape. The mechanism of the device is completely shielded to prevent radiation of lock opening sequences when addressed by the device.

There are a number of modes in which the device could be designed to operate. The desired mode would be selected by the user to meet specific requirements and security rules. Possible modes include the following:

The operator enters the prescribed combination for the lock to be opened. When the rotational sequence for that specific lock is addressed and the cup driving element is pressed against the knob the required opening sequence is run and the opening sequence is retained in memory for future use.

The combination for all the locks and safes at a specific location are previously stored in the memory. Each lock is numbered with a two or three digit code. The specific combination for each lock is selected when the safe number is addressed on the key pad. This frees the operator from having to memorize or otherwise look up each combination before opening the selected lock. If this mode were chosen proper care of the device must be taken to prevent its misuse. To prevent such misuse, the device can be programed in the following manner:

A user access code must be keyed into the device before it will operate. When the access code is accepted the device would operate for a predetermined time span. Then the device would be rendered inoperative until the proper code was again entered. A new access code could be required periodically. An alternate would be to require a second button to be depressed to start the sequence and a release of that button would cause the device to become inactive even if the button was again depressed until the device was again activated by a user access code.

The device could be designed so that any attempt to open it up would result in a complete loss of memory.

The device could be programmed for multi-users each with their own access code group of safe numbers, and combinations.

An object of this invention is to provide a device with a memory containing a plurality of addressable safe combinations which when a driving element is held against the rotatable knob of a combination lock will automatically rotate the knob to a degree of rotation in the proper rotational direction to open the selected combination lock.

Another object of this invention is to provide a device for opening rotational combination locks which includes a memory and a key board for inputting and addressing a plurality of different rotational lock opening sequences.

A further object of this invention is to perform the lock opening task in a completely secure fashion by shielding the device so that it will not emit and electromagnetic energy that could be detected by an unauthorized person.

Another object of this invention is to provide a device that can open rotational combination locks that is easy to operate by a non-technical operator with normal manual dexterity.

Still another object of this invention is to provide a device for opening rotational combination locks that can be easily programmed to meet special requirements of the user.

Other objects, advantages and novel features will be apparent from the following detailed description when read in conjunction with the append claims and attached drawing.

BRIEF DESCRIPTION OF THE DRAWINGS

FIG. 2 shows a side view of a preferred embodiment of the invention;

FIG. 3 shows an end view of FIG. 2 showing a second embodiment of the combination lock knob gripper of the invention;

FIG. 4 shows a top plan view of the device of FIG. 2; and

FIG. 5 shows a cutaway side view of the gripper of FIG. 3.

DETAILED DESCRIPTION OF THE PREFERRED EMBODIMENT

Figure 1:
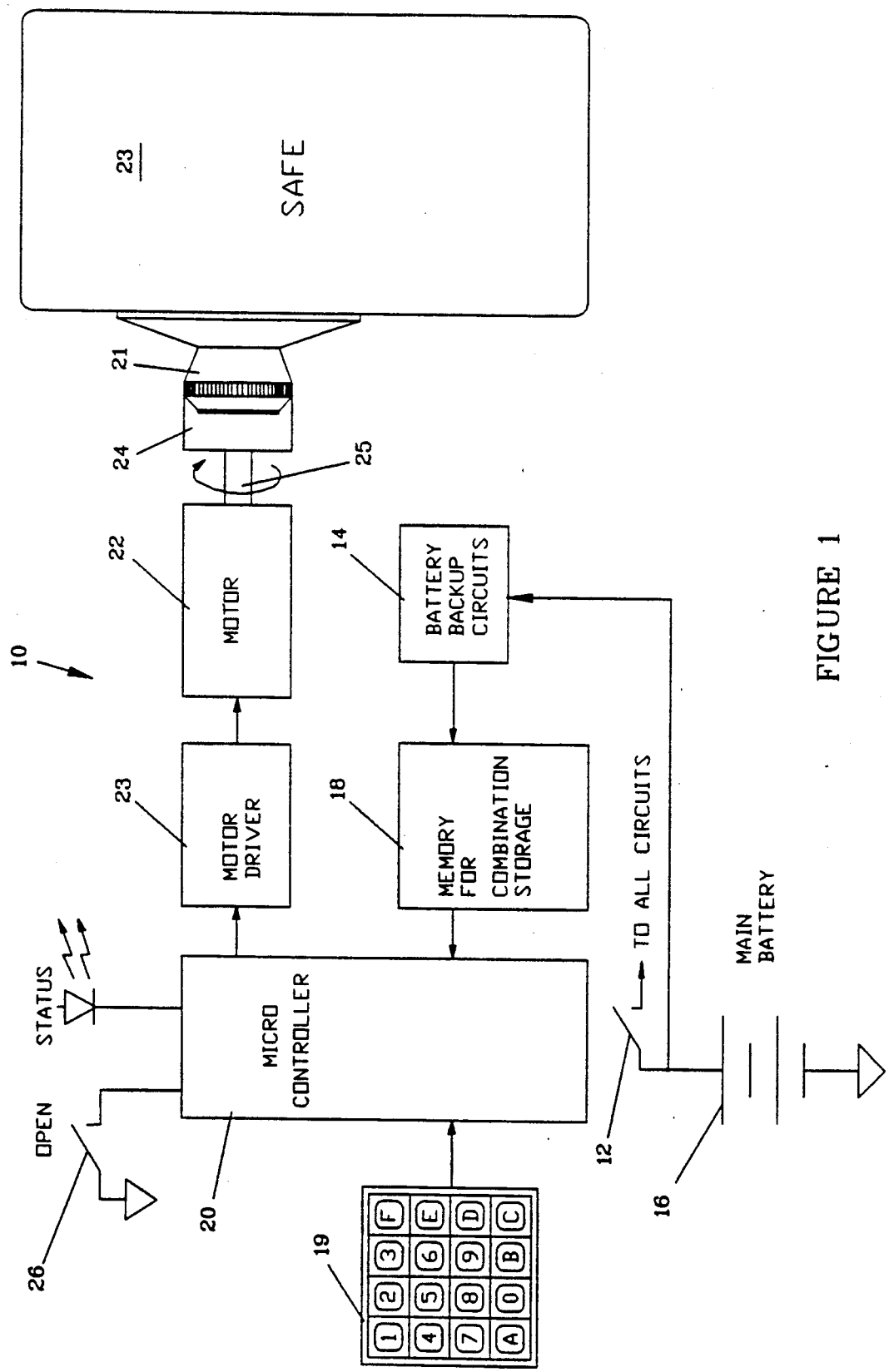
FIG. 1 depicts a block diagram of the invention.

For ease of explanation the device will be described with reference to a typical three tumbler lock. It should be under stood that any practical number of tumblers can be manipulated with this invention. A detailed description of the operation of a combination lock is not required to understand the operation of this invention. The typical combination lock has a dial face that is graduated with equally spaced numbers. Typically the gradation number 100 ranging from 0 to 99. The numbers are indexed against a reference mark. Other number of tumblers and/or graduations are possible. To open the typical lock the following sequence is required. Rotate the dial a minimum of three complete revolutions counter clockwise stopping on the first number of the combination; Rotate the dial counter clockwise passing the third number once and stopping on the third number on the second pass; Rotate the dial clockwise stopping on the number zero; and continue rotating the dial while simultaneously depressing the door handle. On some locks the last step differs or is eliminated.

Referring now to the various drawing Figures. FIG. 1 is a detailed block diagram of the combination lock rotating device 10 depicting the various elements and their relationship. The apparatus is energized with operation of the power off on switch 12 and closure of operation switch 26. The switch 12 selective supplies power to all of the circuit elements except for the battery backup circuit 14. The battery backup circuit is supplied power independently from operation of switch 12 as long as the battery 16 is connected and has a charge. The battery backup circuit supplies sufficient power to a memory 18 when switch 12 is open. The memory is a type 6264LP manufactured by Hitachi or an equivalent thereto Commands and data are entered into the memory via a alphanumeric pad 19 of the type series 83-002 manufactured by Grayhill Corporation or an equivalent thereto. The principle element of the device 10 is a microprocessor 20 of the type 80C31 or equivalent manufactured by Intel Corp. Since a micro controller of this type is programmable the operation and features of the device are easily changed to the requirements of various users. A list of some of the possible commands and features are hereinafter set forth.

As for example, the command for opening a combination lock 21 on a lock or safe 23 with the following known opening sequence of 32, 44 and 65 would be as follows: Turn the power switch 12 to power on; Enter the following number sequence into the key pad 19, i.e., C324465E. In this example the C indicates that the following numerical sequence is a combination and the E terminates the sequence entry mode.

In the preferred embodiment a standard 1.8 degree stepper motor 22 is connected to the output of a conventional L/R stepper motor driver circuit 23. The stepper drive circuit is connected to the output of the micro controller 20. It should be understood that the motor could, however, be a small geared D.C. servo motor with a position feed back sensor. The latter arrangement would provide higher torque, and possibly greater speed but with the disadvantage of increased complexity.

Referring again to the programming sequence noted above, upon depressing the E, the micro controller steps the motor 22 a few degrees counter clockwise and leaves the motor coils (not shown) energized so that the motor is indexed to a full step and will not slip.

The operator of the device would next hand rotate the dial of the lock 21 to "0". This provides the apparatus with a known starting reference point. Then the operator aligns and engages the lock dial with a resilient gripper 24 carried by the end of the motor shaft 25. The gripper 24 of FIG. 1 is not unlike a resilient cup and is used for a similar purpose. The operator then depress the micro controller switch 26 which grounds an input signal to the micro controller which provides a signal to the motor driver circuit causing the motor shaft 25 to rotate in the proper rotational directions through the sequence to open the lock.

FIGS. 2–4 depict various views of one physical embodiment of the devise 10. FIGS. 2 and 4 show a cut away of a second embodiment of the gripper 24a. The gripper shown in FIGS. 2 and 4 is made from rigid material and includes a plurality of different diameter grooves 23a, 23b and 23c each having an appropriate sized "O" ring, 27a and 27b and 27c respectively therein. The grooves are dimensioned to receive the outer surface of stand combination clock dial sizes.

In addition to the basic functions herein above described, the device 10 can be equipped with a memory circuit 18. The combinations are indexed to a particular lock number. Each lock or safe drawer would be labeled with its own identification number. To store a combination in the memory 18 of the devise such as, for example, the combination xx xx xx indexed to lock number yyy the operator of the device would key in the following sequence into the key pad DyyyxxxxxxE. D is the command to store a combination of that lock and E tells the micro controller to execute the command.

With a number of combinations stored in the memory as described above, the operator of the device only has to enter the lock or safe identification number to open a lock. For example, to open lock yyy the operator does not have to know or remember individual lock combinations. To open lock yyy, for example, the operator would key the key pad 19 in the following sequence ByyyE. The B tells the micro controller to retrieve the combination for lock yyy from the memory and execute the motor rotation activation command. As before mentioned the E terminates the icy board entry operation. Again depressing switch 26 starts the motor operation.

In order to prevent unauthorized persons from opening combination locks, an authorization code system may be implemented. An authorization code is stored in the memory as are the lock opening combinations. For use, the operator must key in via the key pad a proper card number in order to permit the use of the device for its intended purpose. For example, a six digit authorization code would be addressed by the operator by entering AaaaaaaE into the key pad. The A indicates that the following number sequence is an authorization code check and the E terminates the entry and starts executes the command. If the authorization code is proper then an LED indicator 30 is caused to illuminate by micro controller activation. Once the LED illuminates signaling a proper authorization code the device operates as hereinbefore described.

Under certain circumstances it might be desirable to have different authorization codes for different groups of locks or safes. This could be implemented in the following manner: Provision is made in the memory 18 to store a number of authorization Codes. When an operator enters a new authorization code a block of memory is reserved to store sate numbers and combinations. Those and only those safe numbers and combinations are accessible to an operator when his authorization code has been entered.

Having implemented an authorization code system it is necessary to be able to change the authorization code for various reasons. In order to change the authorization code in the memory of the device a valid authorization must be exercised as herein before mentioned. The operator would then enter a new code number into the key pad. FnnnnnnE would be the key pad sequence. The F indicates the code change mode, nnnnnn the new code and E enters the new code into the memory and LED is extinguished. The operator then must perform an authorization check using the new code before the new code replaces the old code. This procedure prevents code entry errors from being stored in the code number.

The physical relationship of the various elements of the invention are show in FIGS. 2-4.

Shielding is provided by constructing the case 28 for the device from a suitable metal such as, for example, aluminum steel, copper or the like.

A carrying handle 30 provides easy support for the invention during use and transport of the device.

This invention has been described with reference to a preferred embodiment. Obvious modification and alterations will occur to others reading and understanding of this specification. The invention is to include all such modifications and alterations insofar as they come within the scope of the appended claims or the equivalent thereof.

What is claimed is:

1. A device for opening at least one rotary combination lock of a type having a dial with a face, said face having a number of equally spaced integers about the dial face when the combination is previously known comprising:

a micro controller;

a key pad for inputting information directed to said motor means comprising engaging means for engaging said dial and rotating said dial according to said known combination inputted into said micro controller, said engaging means comprises a motor driven shaft with a dial face engagement means on the distal end thereof, said dial face engagement means comprises a rigid cup member with a plurality of different diameter internal grooves with gripping surface within each of said plurality of grooves; and energizing means for providing power to said micro controller, key pad and motor means.

2. The invention as claimed in claim 1 further comprising a memory means associated with said micro controller for storing a plurality of different known combinations for future reference each of which are inputted from said key pad and can be selectively addressed from said key pad for operation of said motor means.

3. The invention as claimed in claim 2 wherein a second energizing means is used to provide power to said memory means.

4. The invention as claimed in claim 1 wherein said key pad is alphanumeric.

5. The invention as claimed in claim 1 herein said motor means comprises a D.C. motor and a motor driver, said driver being controlled by said micro controller.

6. The invention as defined in claim 1 wherein said cup member adapts to a plurality of different sized dial faces.

7. The invention as defined in claim 5 wherein said D.C. motor is a stepper motor.

8. The invention as described in claim 7 wherein said stepper motor steps in either direction.

9. The invention as defined in claim 1 wherein said gripping surface comprises a resilient "O" ring.

* * * * *